United States Patent
Navoa et al.

(10) Patent No.: US 12,343,961 B2
(45) Date of Patent: Jul. 1, 2025

(54) IMPACT RESISTANT GLASS SCREEN PROTECTOR

(71) Applicant: FELLOWES INC., Itasca, IL (US)

(72) Inventors: Keith Navoa, Wood Dale, IL (US); Eugene Lee, Chicago, IL (US); Harsh Gandhi, Palatine, IL (US); Jeffrey Lienemann, Chicago, IL (US); Michael Schmidt, Chicago, IL (US)

(73) Assignee: FELLOWES INC., Itasca, IL (US)

( * ) Notice: Subject to any disclaimer, the term of this patent is extended or adjusted under 35 U.S.C. 154(b) by 1035 days.

(21) Appl. No.: 17/131,068

(22) Filed: Dec. 22, 2020

(65) Prior Publication Data

US 2021/0187912 A1 Jun. 24, 2021

Related U.S. Application Data

(60) Provisional application No. 62/952,809, filed on Dec. 23, 2019.

(51) Int. Cl.
*B32B 17/10* (2006.01)
*B32B 7/12* (2006.01)
(Continued)

(52) U.S. Cl.
CPC .......... *B32B 17/10284* (2013.01); *B32B 7/12* (2013.01); *B32B 17/10027* (2013.01); *B32B 17/1077* (2013.01); *C09J 7/29* (2018.01); *G02B 1/14* (2015.01); *B32B 2255/10* (2013.01); *B32B 2307/40* (2013.01); *B32B 2307/584* (2013.01); *C09J 2203/37* (2020.08); *C09J 2301/16* (2020.08); *C09J 2400/143* (2013.01); *C09J 2475/006* (2013.01)

(58) Field of Classification Search
CPC ........ B32B 17/10284; B32B 17/10027; B32B 17/1077; B32B 2255/10; B32B 2307/40; B32B 2307/584; B32B 2307/412; B32B 2307/75; B32B 2457/00; B32B 27/08; B32B 25/08; B32B 27/40; C09J 7/29; C09J 2203/37; C09J 2301/16; C09J 2400/143; C09J 2475/006; H04M 1/0266; H04M 1/185
See application file for complete search history.

(56) References Cited

U.S. PATENT DOCUMENTS 9,063,699 B1 * 6/2015 Huang ................. H04B 1/3888
9,092,195 B1 * 7/2015 Huang ................... B32B 37/18
(Continued)

FOREIGN PATENT DOCUMENTS

JP 2012091406 A * 5/2012
JP 2020011471 A * 1/2020

OTHER PUBLICATIONS

Machine translation of JP 2020-011471A (2023) (Year: 2023).*
Machine Translation of JP 2012-091406A (Year: 2024).*

*Primary Examiner* — Scott R. Walshon
(74) *Attorney, Agent, or Firm* — Wood, Phillips, Katz, Clark & Mortimer (57) ABSTRACT

Disclosed is a multi-layer screen protector for a display of an electronic device. The screen protector may include a glass exterior surface for tactile response, an optically clear anti-explosion adhesive to contain broken glass from the protector or the display, and a TPU layer to provide impact resistance. The screen protector may be flat or curved.

19 Claims, 6 Drawing Sheets

(51) Int. Cl.
*C09J 7/29* (2018.01)
*G02B 1/14* (2015.01)

(56) References Cited

U.S. PATENT DOCUMENTS

| | | | |
|---|---|---|---|
| 2009/0208739 A1* | 8/2009 | Husemann | C08F 293/005 |
| | | | 156/60 |
| 2017/0212051 A1* | 7/2017 | De Lacerda | B32B 9/045 |
| 2019/0241013 A1* | 8/2019 | Hyvönen | B32B 7/06 |
| 2019/0322071 A1* | 10/2019 | Liu | B32B 27/40 |
| 2020/0198300 A1* | 6/2020 | Liu | C09J 7/25 |

* cited by examiner

IMPACT RESISTANT GLASS SCREEN PROTECTOR

BACKGROUND OF THE INVENTION

Field of the Invention

The invention relates to transparent covers, overlays or protectors to overlay displays of portable electronic devices.

Background Art

Glass screen protectors have existed for displays. However, the protectors of the past have been used primarily for scratch protection and have not included structure to address impacts or prevent the release of the underlaying glass in the event of the display shattering. They are not typically designed to help absorb the impact energy associated with a drop event—glass is brittle and extremely inelastic, so during a collision impact energy will either be transferred through the glass protector to the display or absorbed by the glass of the protector, resulting in it shattering. If the impact is severe enough, the display of the device may also be harmed.

Laminated impact resistant screen protectors have also existed, but the screen protectors of the past have not included a glass layer exposed as the exterior layer for the user to interact with. Such an exposed layer gives the user a tactile feel and response similar to the original display of smart phones that utilize a glass exterior surface for the display.

SUMMARY OF THE INVENTION

The invention is a multi-layered screen protector. Such a screen protector may be considered a sacrificial protector to prevent damage to the electronic device. The invention includes layers of material and adhesives to provide suitable optical clarity, as well as impact and scratch resistance. The overlays protect the display screen from impacts by providing a cushion and in the case of an impact that is sever enough to break the glass, contains the glass. The layers of the laminate may include tempered glass, optically clear adhesive, thermoplastic polyurethane, UV printing, and double sided adhesives. The layers may be coextensive with each other, or they may overlie portions of the layers above or below. In most embodiments, it is preferred that the layer of tempered glass is dimensionally similar to the display glass of the display it protects, but such construction is not necessary for the invention.

The invention disclosed herein also reduces the likelihood of the device display glass shattering during a drop or other impact event. The invention is an improvement of the prior art by adding a TPU and anti-explosion glue or adhesive layer affixed to the rear of the screen protector display glass. These additional layers enhance the impact protection offered by the screen protector by providing a cushioning, shock absorbent layers. In the event of the glass failing/shattering, the broken components are safer to handle through improved containment of the fractured glass fragments, which remain bonded to the TPU and anti-explosion layers as opposed to separating/scattering.

DETAILED DESCRIPTION OF THE PREFERRED EMBODIMENT

Figure 1:
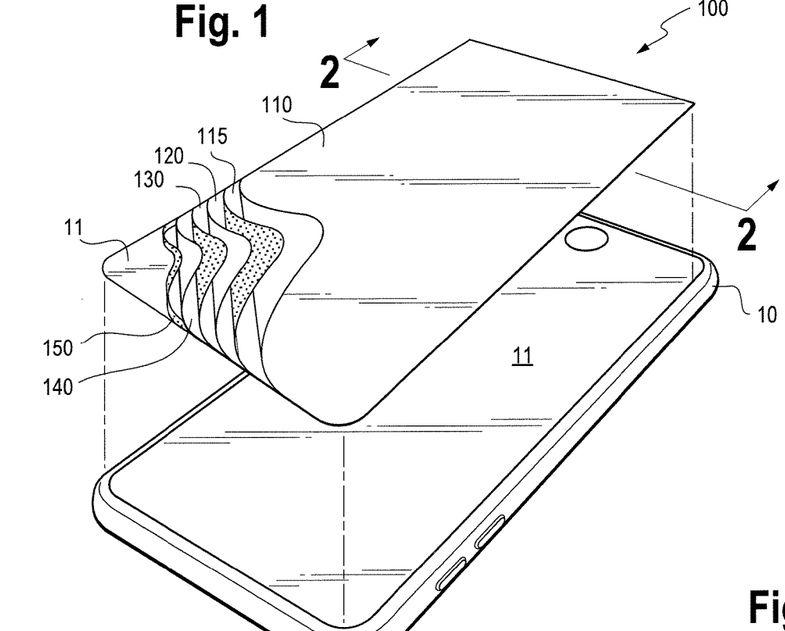
FIG. 1 is a perspective view of a multi-layer screen protector applied to a phone display, the phone display removed from the phone for illustrative purposes.
Figure 1A:
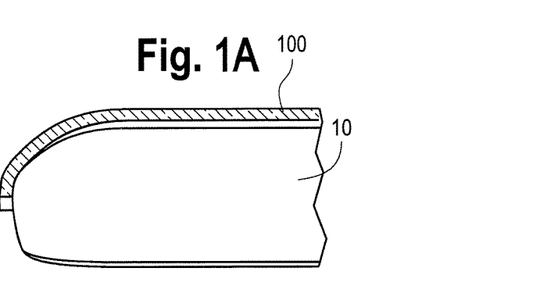
FIG. 1A is a cross-sectional view of a screen protector applied to a phone with a curved display.
Figure 2:
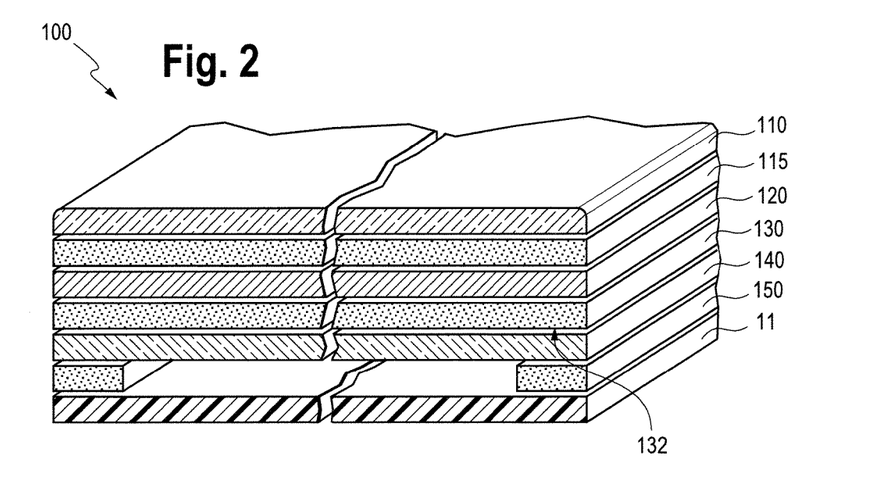
FIG. 2 is a cross-sectional view of the screen protector of FIG. 1.
Figure 3:
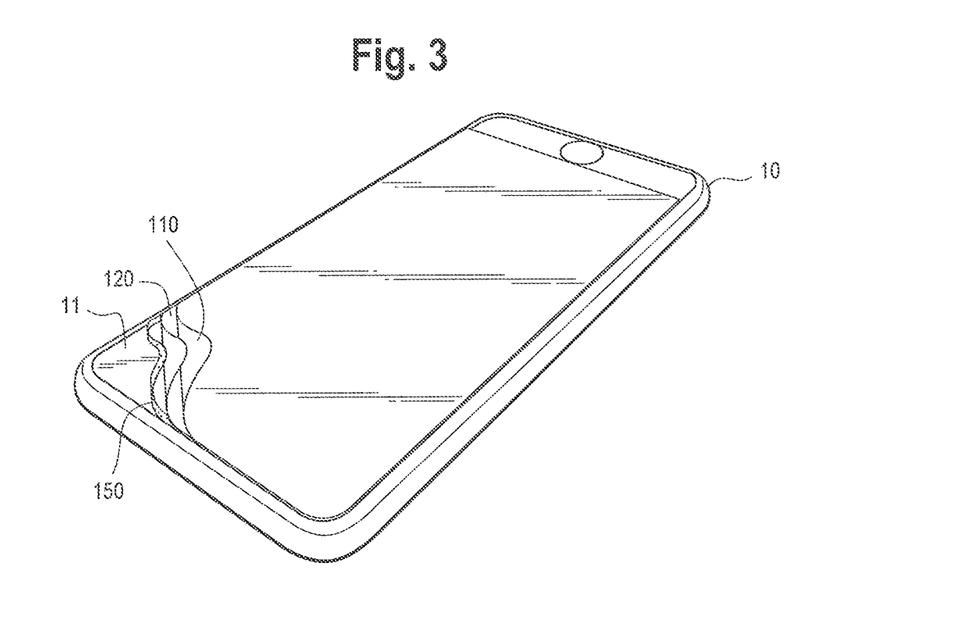
FIG. 3 is a perspective view of a screen protector having a glass layer, a TPU layer, and an adhesive layer applied to a display of a phone.
Figure 4:
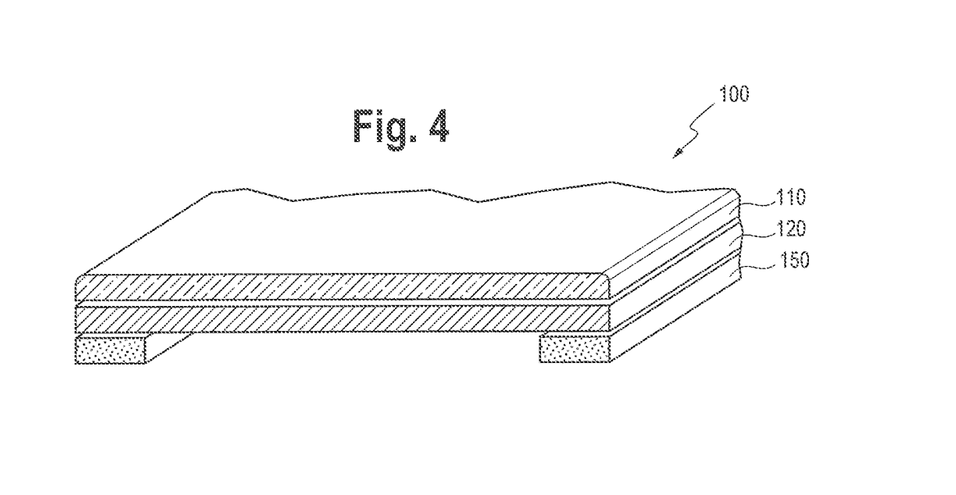
FIG. 4 is a cross-sectional view of the screen protector of FIG. 3.
Figure 5:
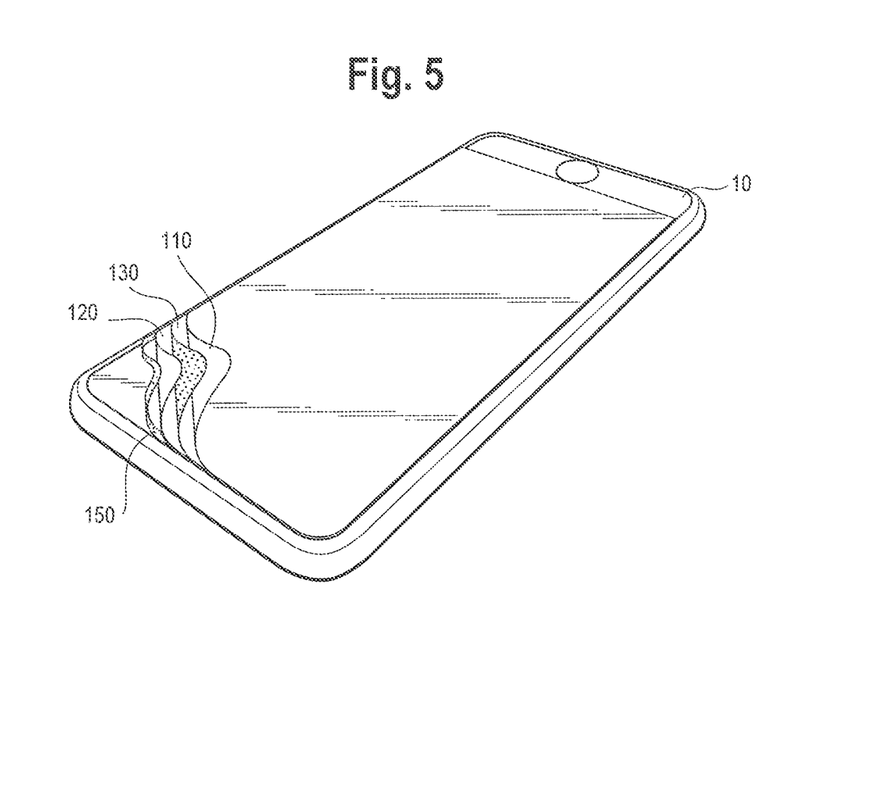
FIG. 5 is a perspective view of a screen protector having a glass layer, an adhesive layer which may be an anti-explosion layer, and TPU layer, and an adhesive layer applied to a display of a phone.
Figure 6:
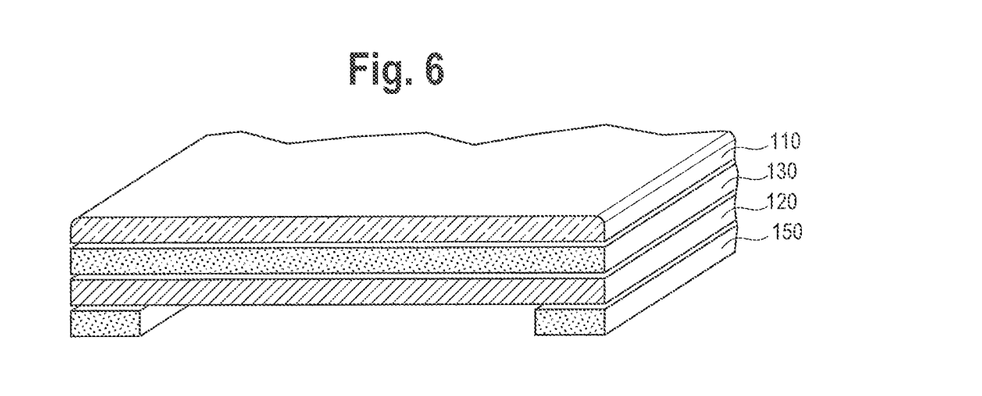
FIG. 6 is a cross-sectional view of the screen protector of FIG. 5.
Figure 7:
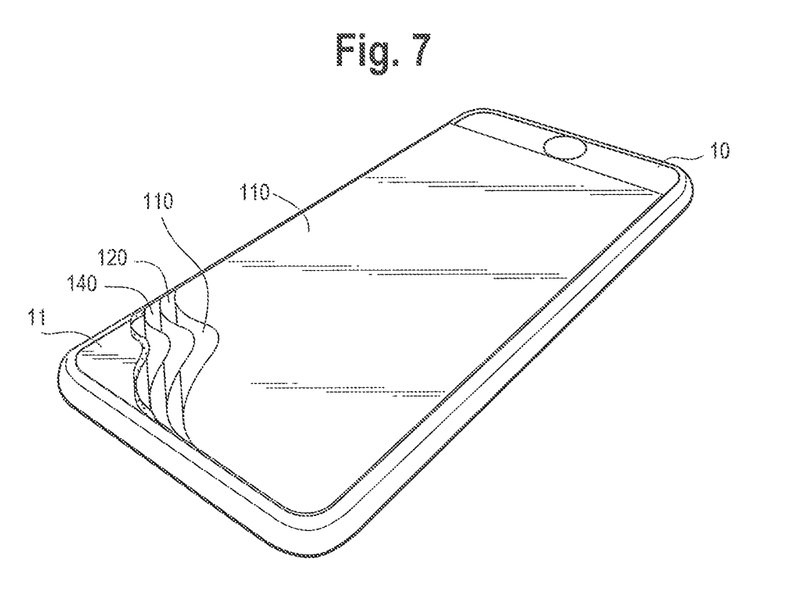
FIG. 7 is a perspective view of a screen protector having a glass layer, TPU layer, a UV printing layer, and an adhesive layer applied to a display of a phone.
Figure 8:
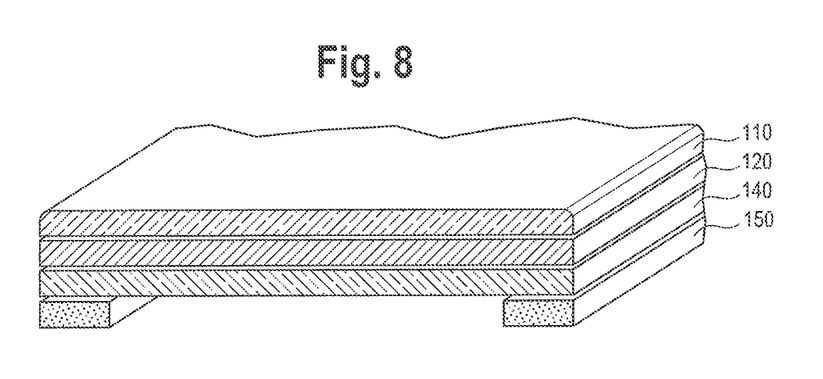
FIG. 8 is a cross-sectional view of the screen protector of FIG. 7.
Figure 9:
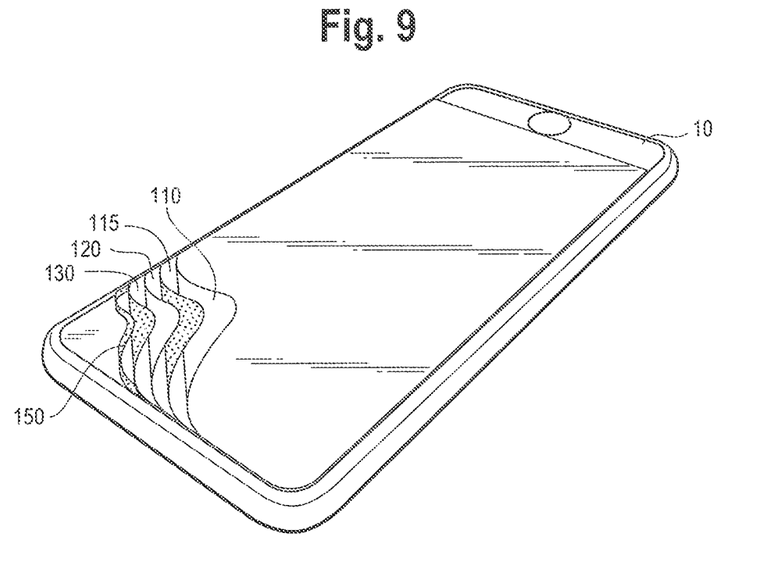
FIG. 9 is a perspective view of a screen protector having a glass layer, an optically clear adhesive layer, TPU layer, an anti-explosion adhesive layer, and a perimeter adhesive layer applied to a display of a phone.
Figure 10:
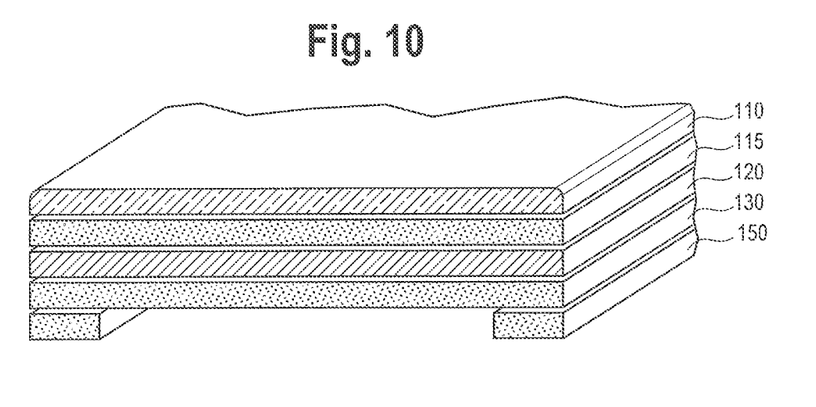
FIG. 10 is a cross-sectional view of the screen protector of FIG. 9.
Figure 11:
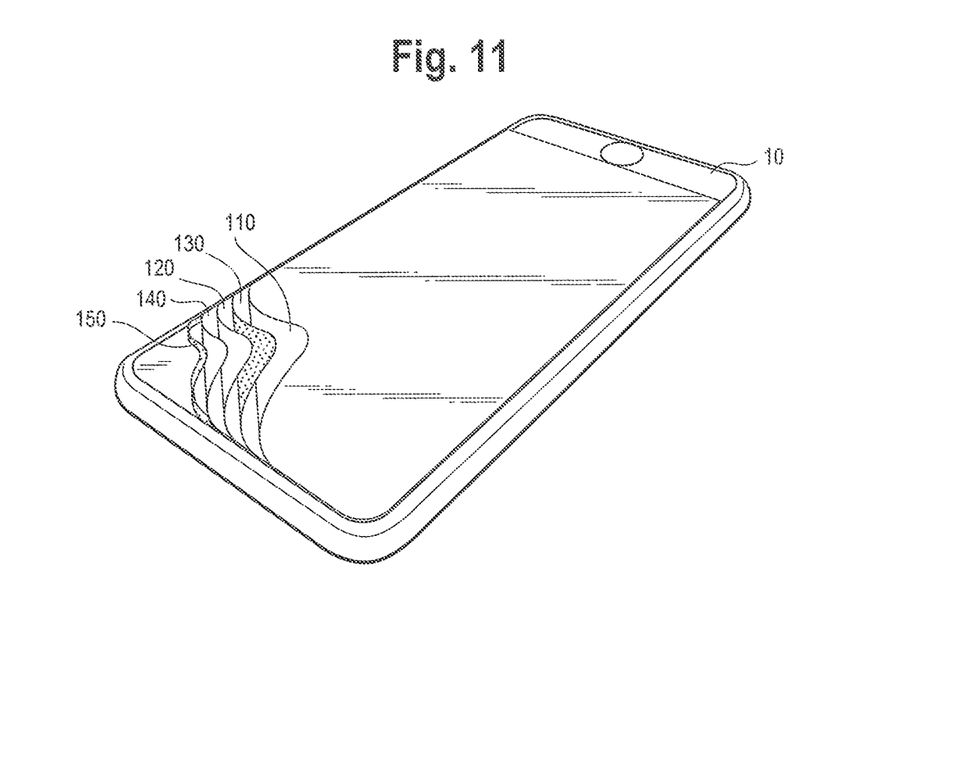
FIG. 11 is a perspective view of a screen protector having a glass layer, an optically clear adhesive layer or anti-explosion layer, a TPU layer, a UV printed layer, and a perimeter adhesive layer applied to a display of a phone.
Figure 12:
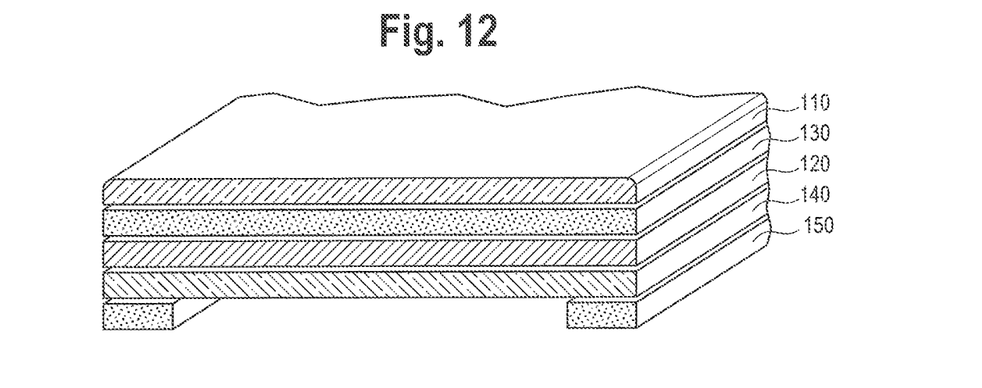
FIG. 12 is a cross-sectional view of the screen protector of FIG. 11.

With reference to the figures, in one embodiment, the invention discloses a laminated screen protector 100 for a mobile electronic device 10 having a display 11. The screen protector may be generally flat, or it may be curved as shown in FIG. 1A.

The screen protector may include in some embodiments, an outwardly facing glass layer 110. The glass layer 110 may be co-extensive or nearly coextensive with the display 11 of the mobile electronic device 10. In the most preferred embodiment, the glass layer 110 is 0.33 mm thick, but the thickness may vary.

The glass layer 110 may be tempered glass, Sapphire, rigid clear polymers, or other materials that are optically clear. In other embodiments, the glass layer 110 may include exterior coatings that improve oleophobicity, hydrophobicity, glare resistance, privacy films, etc. to enhance or add properties of material. Structures such a polarization gratings or louvers may also be present.

The glass layer 110 may be curved to conform to a curve of the display 11 if a curve is present. It is preferred that the glass 110 is curved by heat bending.

The screen protector may include a layer of optically clear adhesive 115 disposed on the underside or inward facing surface 112 of the glass layer 110. In the most preferred embodiment, the optically clear adhesive 115 is Kawin KN6050, but other adhesives may be used if they are optically clear. In the most preferred embodiment, the optically clear adhesive 115 is 0.05 mm thick, although the thickness may vary.

The optically clear adhesive 115 is generally coextensive with the underlying TPU layer 120. However, in some embodiments, the optically clear adhesive 115 may be applied only to select portions of the inward facing surface 112 of the glass layer 110, or to select portion of the TPU layer 120. The optically clear adhesive 115 adheres the TPU layer 120 to the inward facing surface 112 of the glass layer. One skilled in the art will recognize that the TPU layer may be made of some plastic or polymer material other than TPU that have a low durometer when compared to the glass layer 110 or include a flexible elastomer.

In some embodiments, the TPU layer 120 may be formed on the glass layer 110 without the need for an adhesive. Similarly, the UV printed layer 140 may be printed directly on the TPU layer.

In some embodiments of the invention, the screen protector 100 includes a layer that will contain or adhere the glass fragments of the display 11 or the glass layer 110. The layer is referred to as an anti-explosion adhesive 130. The anti-explosion adhesive 130 is preferably 0.075 mm thick, but the thickness can vary. The anti-explosion adhesive 130 is preferably coextensive with the glass layer 110 or the display 11. In some embodiments, the anti-explosion adhesive may be used in any place that an optically clear adhesive is needed.

In some embodiments, the lower surface 132 of the anti-explosion adhesive 130 does not have an adhesive property, so that it does not stick to the layer below it. This does not prevent the adherence of a UV printing layer 140.

In some embodiments of the invention, a UV printing layer 140 is printed on the anti-explosion adhesive 130. The UV printing layer may be composed of a field of dots or other structures to act as spacers to maintain a slight gap between the lower surface 132 of the anti-explosion adhesive layer 130 and the display 11. In the most preferred embodiment, the spacers are a field of rigid hemispherical dots.

The UV printing layer 140 is preferably coextensive with the anti-explosion adhesive layer 130, but need not be. The UV printing layer 140 is approximately 0.1 mm thick, but the thickness may vary. The purpose of the UV printing layer is to prevent or diminish Newton Rings or other optical distortions that may be created by two films in close proximity. In the most preferred embodiment, the UV printing layer 140 is formed with Kunyutong UV110. In some embodiments, the UV printing layer 140 includes 0.05 mm dots with 1 mm spacing between the dots. Other dots and variations of the field spacing may be used.

In some embodiments of the invention, the UV printing layer 140 is not printed at all, but is sprayed or dipped.

In some embodiments, the UV printing layer 140 is also known as an anti-newton ring layer 135.

In some embodiments a double-sided adhesive layer 150 that is optically clear is used to attach the screen protector 100 including any of the previously described layers to the display 11. The adhesive layer 150 is preferably 0.1 mm thick, but the thickness may vary. In the most preferred embodiment, the temporary adhesive layer is preferably temporary on the side that adheres to the display 11 so that the screen protector 100 can be removed. In the most preferred embodiment, the temporary adhesive layer is Julidatong DT011. Other adhesives such as Fancy FSA-842BD-3-A may be used.

The double-sided adhesive layer 150 is preferably applied to the perimeter of the screen protector 100 lamination. The double-sided adhesive layer 150 need not cover the central portion of the lamination. In an embodiment where the UV printing layer 140 or other spacing structure is omitted, it is preferable to have the double-sided adhesive layer is coextensive with the layer above it, such as the anti-explosion adhesive 130.

In some embodiments, a release liner 160 is placed on the double-sided adhesive layer to prevent the adhesive form sticking to objects prior to the installation of the screen protector 100 onto a device with a display 11.

One skilled in the art will recognize that the layers described herein may be laid-up in different combinations. It is also noted that the figures show materials for illustrative purposes and the folding back of a material, such as a glass layer, does not necessarily imply the material will bend or flex to the degree illustrated.

The foregoing disclosure of specific embodiments is intended to be illustrative of the broad concepts comprehended by the invention.

We claim:

1. A screen protector for placement on a screen of an electronic device, the screen protector having a lamination including:
    a layer of glass having a first surface and a second surface, the first surface of the layer of glass being outward facing, the second surface of the layer of glass being screen facing, a first adhesive layer of optically clear adhesive in contact with the second surface of the glass layer, a thermoplastic polyurethane (TPU) layer having a first surface in contact with the first layer of optically clear adhesive and a second surface, the second surface in contact with a second adhesive layer, the second adhesive layer having a first surface in contact with the TPU layer and a second surface facing the screen, and a ultraviolet (UV) printing layer, the UV printing layer having a first surface in contact with the second surface of the second adhesive layer, a third adhesive layer, the third adhesive layer having a first surface in contact with a second surface of the UV printing layer, and a second surface capable of being in contact with the screen.

2. The screen protector of claim 1, wherein the second adhesive layer is an anti-explosion adhesive to adhere glass fragments of the screen or layer of glass of the screen protector when the screen or layer of glass break.

3. The screen protector of claim 2, wherein the first and second adhesive layers are made of the same adhesive.

4. The screen protector of claim 1, wherein the layer of glass includes a coating on the first surface of the layer of glass.

5. The screen protector of claim 1, wherein the third adhesive layer is absent from a central portion of the lamination.

6. The screen protector of claim 1, wherein the third adhesive layer is a double-sided adhesive.

7. The screen protector of claim 6, wherein the third adhesive layer second surface is a temporary adhesive.

8. A screen protector for a display of an electronic device, the screen protector including a lamination of layers, the layers including:
    a layer of glass having a first surface and a second surface, an optically clear adhesive layer adhered to the second surface of the layer of glass, an anti-Newton ring layer in contact with the optically clear adhesive layer, the anti-Newton ring layer reducing Newton rings, and a double-sided adhesive to attach the lamination to the display, wherein at least a portion of the double-sided adhesive layer is in contact with the optically clear adhesive layer.

9. The screen protector of claim 8, wherein the double-sided adhesive is attached to the lamination at the perimeter of the lamination.

10. The screen protector of claim 8, wherein the lamination further includes a TPU layer.

11. The screen protector of claim 8, wherein the double-sided adhesive layer includes a surface facing the display, the display facing surface being a temporary adhesive.

12. A screen protector for a display of an electronic device, the screen protector including a lamination of layers, the layers including:
a layer of glass having a first surface and a second surface, an optically clear adhesive layer adhered to the second surface of the layer of glass, an anti-Newton ring layer in contact with the optically clear adhesive layer, the anti-Newton ring layer reducing Newton rings, and a double-sided adhesive to attach the lamination to the display,
wherein the anti-Newton ring layer is a field of dots on a surface of the optically clear adhesive layer, the dots being 0.1 mm thick.

13. The screen protector of claim 12, wherein the lamination includes a TPU layer.

14. A screen protector for placing on and being in contact with a display of an electronic device, the screen protector including:
a glass layer having a first surface and a second surface, an anti-explosion adhesive layer having a first surface and a second surface, the first surface of the anti-explosion adhesive layer in contact with the second surface of the glass layer, a TPU layer having a first surface and a second surface, the second surface of the anti-explosion adhesive layer in contact with the first surface of the TPU layer, and a double-sided adhesive layer capable of being in contact with the display.

15. The screen protector of claim 14, wherein the double-sided adhesive is not in contact with a central portion of the display.

16. The screen protector of claim 14, wherein the double-sided adhesive layer has a first surface capable of being in contact with the display, the first surface being a temporary adhesive.

17. The screen protector of claim 14 further including an anti-Newton ring layer between the display and the anti-explosion adhesive layer, the anti-Newton ring layer spacing apart the display and the anti-explosion adhesive layer to reduce Newton rings.

18. The screen protector of claim 14 wherein the anti-explosion adhesive layer is at least 0.075 mm in thickness.

19. The screen protector of claim 14, wherein the anti-explosion adhesive layer is coextensive with the glass layer.

* * * * *